United States Patent
Athad

(10) Patent No.: US 10,589,357 B2
(45) Date of Patent: Mar. 17, 2020

(54) CUTTING INSERT HAVING A SPLIT CUTTING EDGE WITH LEADING AND TRAILING COMPONENT CUTTING EDGES

(71) Applicant: Iscar, Ltd., Tefen (IL)

(72) Inventor: Shimon Athad, Maalot (IL)

(73) Assignee: Iscar, Ltd., Tefen (IE)

( * ) Notice: Subject to any disclaimer, the term of this patent is extended or adjusted under 35 U.S.C. 154(b) by 0 days.

(21) Appl. No.: 15/926,117

(22) Filed: Mar. 20, 2018

(65) Prior Publication Data

US 2018/0326502 A1 Nov. 15, 2018

Related U.S. Application Data

(60) Provisional application No. 62/506,081, filed on May 15, 2017.

(51) Int. Cl.
*B23B 27/16* (2006.01)
*B23B 27/04* (2006.01)

(52) U.S. Cl.
CPC ........ *B23B 27/1611* (2013.01); *B23B 27/045* (2013.01); *B23B 2200/204* (2013.01); *B23B 2200/24* (2013.01); *B23B 2200/3681* (2013.01)

(58) Field of Classification Search
CPC .............. B23B 27/1611; B23B 27/045; B23B 2200/204; B23B 2200/24; B23B 2200/3681
See application file for complete search history.

(56) References Cited

U.S. PATENT DOCUMENTS

| | | | |
|---|---|---|---|
| 2,424,041 A | 7/1947 | Luers | |
| 5,423,639 A | 6/1995 | Wiman | |
| 5,975,812 A | 11/1999 | Friedman | |

FOREIGN PATENT DOCUMENTS

| | | | | |
|---|---|---|---|---|
| CN | 1059857 A | | 4/1992 | |
| CN | 101698243 | | 4/2010 | |
| CN | 101698243 A | | 4/2010 | |
| DE | 2323524 A1 | | 12/1973 | |
| EP | 3318354 A1 | | 5/2018 | |
| GB | 1414591 A | | 11/1975 | |
| SU | 831388 A1 | | 5/1981 | |
| SU | 986616 A1 | * | 1/1983 | ........... B23B 27/045 |
| SU | 986616 A1 | | 1/1983 | |

OTHER PUBLICATIONS

English translation of SU 986616 (Year: 1983).*

(Continued)

*Primary Examiner* — Alan Snyder
(74) *Attorney, Agent, or Firm* — Womble Bond Dickinson (US) LLP

(57) ABSTRACT

A cutting insert includes a split cutting edge, formed at an intersection of the insert forward surface and the insert upper surface, the split cutting edge includes an axially leading cutting edge and an axially trailing cutting edge. An undercut is located in the insert forward surface and interrupts the split cutting edge at an undercut edge portion that extends between the leading and trailing cutting edges. The undercut edge portion transitions into the axially trailing cutting edge at a straight trailing cutting edge portion of the trailing cutting edge.

28 Claims, 5 Drawing Sheets

(56) References Cited

OTHER PUBLICATIONS

Database WPI, Week 198345, Thompson Scientific, London, GB, AN 1983-812911, XP002783584, Jan. 7, 1983.
Kennametal, "A3 Deep Grooving—Technical Data," XP002783585, pp. B84-B85, retrieved from the Internet URL:https://www1.mscdirect.com/images/solutios/kennametal/a3DeepGroovingTechData.pdf, Aug. 2, 2018.
International Search Report dated Aug. 13, 2018, issued in PCT counterpart application (No. PCT/IL2018/050454).
Written Opinion dated Aug. 13, 2018, issued in PCT counterpart application (No. PCT/IL2018/050454).

\* cited by examiner

CUTTING INSERT HAVING A SPLIT CUTTING EDGE WITH LEADING AND TRAILING COMPONENT CUTTING EDGES

RELATED APPLICATIONS

The present application claims priority to U.S. Provisional Patent Application No. 62/506,081 filed May 15, 2017. The contents of the aforementioned application are incorporated by reference in their entirety.

FIELD OF THE INVENTION

The subject matter of the present application relates to cutting inserts and, in particular, to cutting inserts having a chip-splitting arrangement.

BACKGROUND OF THE INVENTION

Cutting inserts can be provided with a chip-splitting arrangement for splitting chips during metal cutting operations. Typically, the chip-splitting arrangement is formed by at least two spaced apart main cutting edges.

In some such cutting inserts designed for grooving and/or parting cutting operations, the at least two main cutting edges can be spaced apart in the axial direction. Examples of such cutting inserts are disclosed in, for example, CN 101698243 A and U.S. Pat. No. 5,975,812.

SUMMARY OF THE INVENTION

In accordance with a first aspect of the subject matter of the present application there is provided a cutting insert, having an insert axis defining opposite forward and rearward directions, the cutting insert comprising:

axially opposite insert forward and rearward surfaces and an insert peripheral surface extending therebetween, the insert peripheral surface including opposite insert upper and lower surfaces and opposite insert side surfaces that connect the insert upper and lower surfaces;

an insert lateral axis that is perpendicular to the insert axis, an insert vertical axis that is perpendicular to the insert axis and the insert lateral axis and intersects the insert upper and lower surfaces, a first vertical plane defined by insert axis and the insert vertical axis and a second vertical plane defined by the insert lateral axis and the insert vertical axis;

a split cutting edge, formed at an intersection of the insert forward surface and the insert upper surface, and comprising leading and trailing cutting edges, the leading cutting edge being axially forward of the trailing cutting edge; and an undercut located in the insert forward surface and interrupting the split cutting edge at an undercut edge portion that extends between the leading and trailing cutting edges; wherein:

the trailing cutting edge comprises a straight trailing cutting edge portion;

in a top view of the cutting insert, an imaginary line that is parallel to the insert axis tangentially touches and intersects the split cutting edge at a tangent point and an intersection point, the tangent and intersection points delimiting an axial extent of the undercut edge portion; and the intersection point is an end-point of the straight trailing cutting edge portion.

It is understood that the above-said is a summary, and that features described hereinafter may be applicable in any combination to the subject matter of the present application, for example, any of the following features may be applicable to the cutting insert:

The undercut edge portion can comprise a straight undercut edge portion, the straight undercut edge portion being co-linear with the straight trailing cutting edge portion. The intersection point can be an end-point of the straight undercut edge portion.

The tangent point can be an end-point of a convexly curved leading cutting edge portion of the leading cutting edge.

The tangent point can be an end-point of a convexly curved undercut edge portion of the undercut edge portion.

The insert forward surface can comprise leading and trailing relief surfaces. The insert upper surface can comprise leading and trailing rake surfaces. The leading and trailing cutting edges can be formed at the intersection of the leading and trailing relief surfaces and the leading and trailing rake surfaces, respectively.

The leading rake surface can be defined by a leading rake plane and the trailing rake surface can be defined by a trailing rake plane. The leading and trailing rake planes can be parallel to each other and spaced apart from each other by a rake plane distance.

The rake plane distance can be in the range $0.2 \text{ mm} \leq D \leq 0.3 \text{ mm}$.

The leading and trailing rake planes can be sloped upwardly in the rearward direction.

The opposite insert side surfaces include a leading side surface, which is closer to the leading cutting edge than to the trailing cutting edge, and a trailing side surface which is closer to the trailing cutting edge than to the leading cutting edge. The leading rake surface can comprise a laterally inclined surface extending upwardly from the trailing rake surface in a direction towards the leading side surface.

The laterally inclined surface can extend to the undercut edge portion in the forward direction.

The laterally inclined surface can extend to the chip-control arrangement located on the leading rake surface and forms a ridge edge at the chip-control arrangement.

The leading and trailing rake surfaces can each comprise a chip-control arrangement that is spaced apart from the split cutting edge.

Each chip-control arrangement can be a chip-control depression recessed in the respective rake surface.

The cutting insert can comprise exactly one undercut located in the insert forward surface and interrupting the split cutting edge.

In a top view of the cutting insert, the straight trailing cutting edge portion can be perpendicular to the insert axis.

In a forward view of the cutting insert, the straight trailing cutting edge portion can be parallel to the insert lateral axis that is perpendicular to the insert axis.

The leading cutting edge can comprise a straight leading cutting edge portion.

In a top view of the cutting insert, the straight leading and trailing cutting edge portions can be parallel with each other.

In a top view of the cutting insert, the straight leading and trailing cutting edge portions can be perpendicular to the insert axis.

In a forward view of the cutting insert, the straight leading and trailing cutting edge portions can be parallel with each other.

In a forward view of the cutting insert, the straight leading and trailing cutting edge portions can be parallel to the insert lateral axis.

In a forward view of the cutting insert, the straight leading and trailing cutting edge portions can be aligned with each other.

Measured in a direction along the insert lateral axis, the leading cutting edge can have a leading cutting edge length. The trailing cutting edge can have a trailing cutting edge length. The leading cutting edge length can be in the range $75\% \leq L_T \leq 125\%$.

The split cutting edge can comprise only a single leading cutting edge and a single trailing cutting edge, between the opposite side surfaces.

In a top view of the cutting insert, the cutting insert can lack mirror symmetry about the first vertical plane.

BRIEF DESCRIPTION OF THE FIGURES

For a better understanding of the present application and to show how the same may be carried out in practice, reference will now be made to the accompanying drawings, in which.

Figure 1:
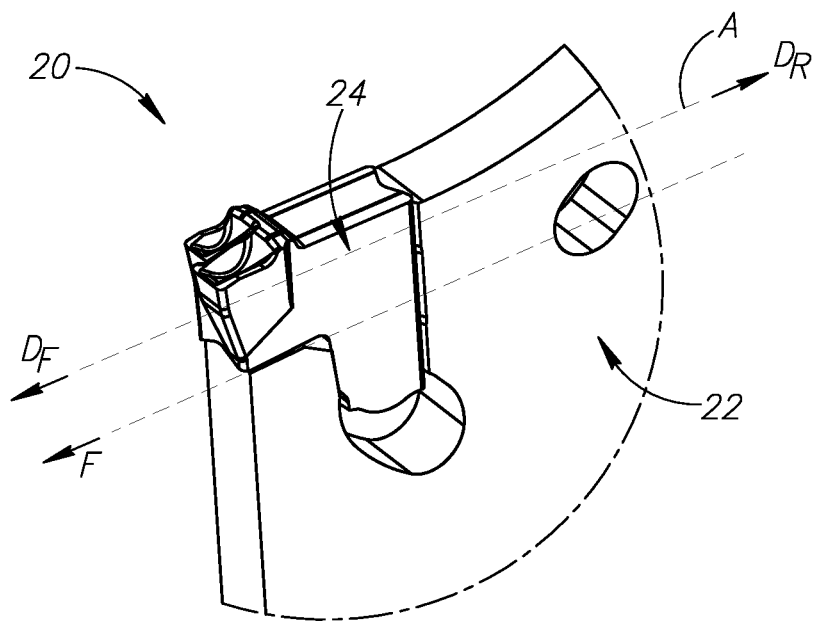
FIG. 1 is a fragmentary perspective view of a cutting tool.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
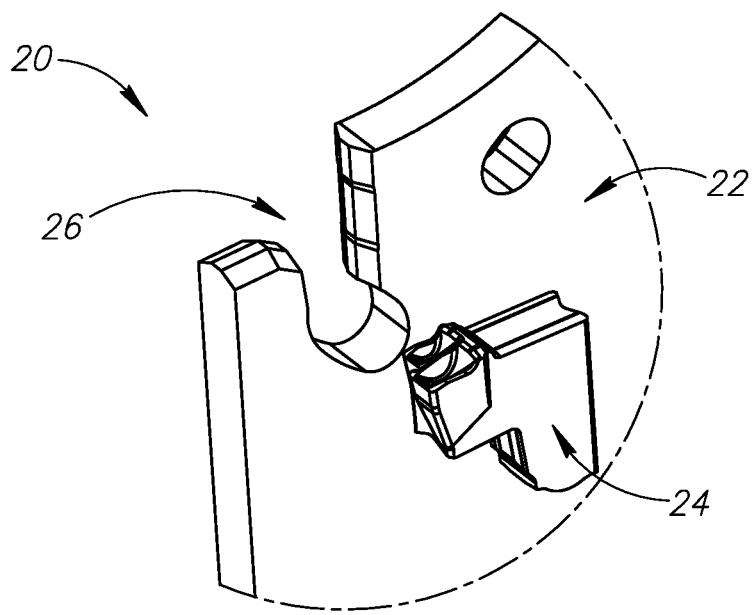
FIG. 2 is an exploded perspective view of the cutting tool shown in FIG. 1.

Attention is first drawn to FIGS. 1 and 2 showing a cutting tool 20, for chip removal. In this non-limiting example shown in the drawings, the cutting tool 20 is a grooving/parting tool. However, the subject matter of the present application is not restricted only to grooving/parting tools and could also be applicable to, for example but not limited to, milling tools. The cutting tool 20 has a tool holder 22 which can be typically made from steel. The cutting tool 20 also has at least one cutting insert 24, releasably attached to the tool holder 22. In this non-limiting example shown in the drawings, the cutting insert 24 is resiliently retained in an insert pocket 26 of the tool holder 22. Thus, the cutting insert 24 is devoid of a screw hole for locating a retaining screw therein. The cutting insert 24 can be typically made from cemented carbide.

Reference is now made to FIGS. 3 to 6, showing the cutting insert 24, in accordance with the subject matter of the present application. The cutting insert 24 includes a unitary integral one-piece construction. The cutting insert 24 has an insert axis A that defines opposite forward and rearward directions $D_F$, $D_R$. As shown in FIG. 1, in the case of a grooving/parting tool, the insert axis A can be co-directional with a feed direction F of the cutting tool 20. The cutting insert 24 includes axially opposite insert forward and rearward surfaces 28, 30 and an insert peripheral surface 32 that extends therebetween. The insert forward surface 28 is located at a forward end of the cutting insert 24 and the insert rearward surface 30 is located at a rearward end of the cutting insert 24.

Figure 4:
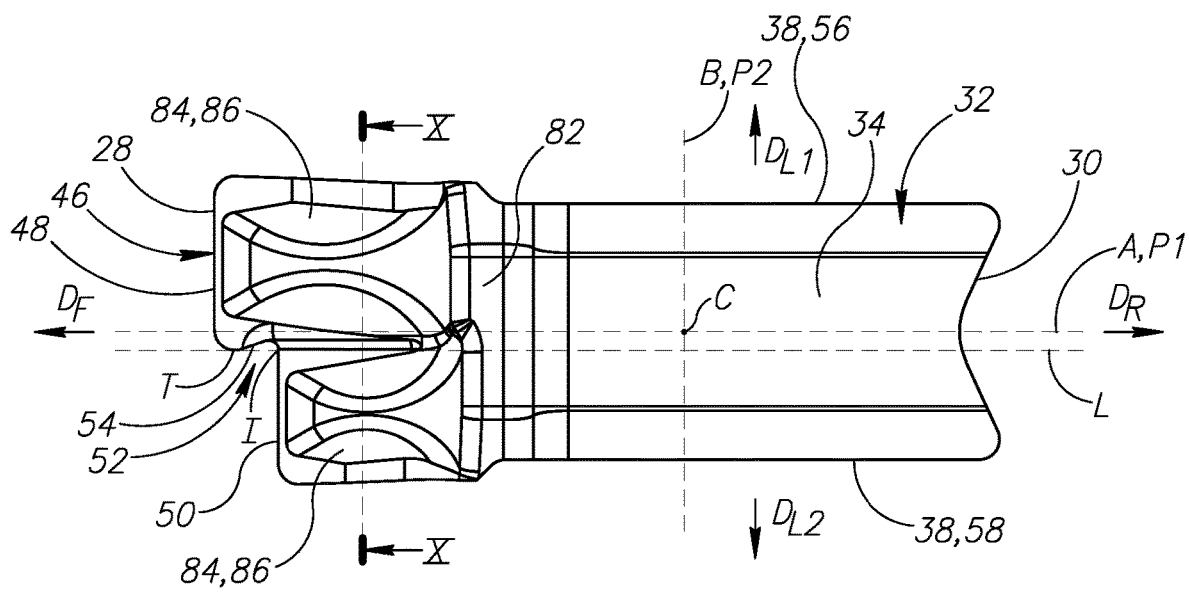
FIG. 4 is a top view of the cutting insert shown in FIG. 3.
Figure 5:
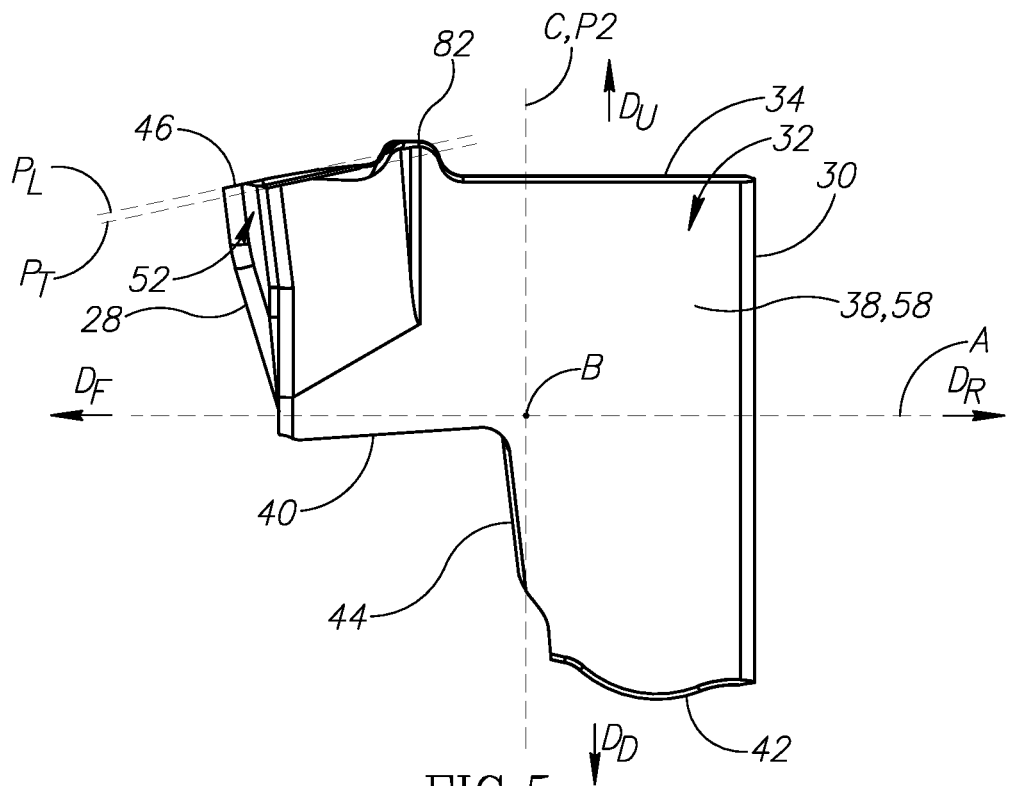
FIG. 5 is a side view of the cutting insert shown in FIG. 3.

It should be appreciated that use of the terms "forward" and "rearward" throughout the description and claims refer to a relative position in a direction of the insert axis A towards the left and right, respectively, in FIGS. 4 and 5.

The insert peripheral surface 32 extends peripherally along the insert axis A. Thus, the insert axis A intersects the insert forward and rearward surfaces 28, 30. The insert peripheral surface 32 includes opposite insert upper and lower surfaces 34, 36 and opposite insert side surfaces 38 that connect the insert upper and lower surfaces 34, 36.

In this non-limiting example shown in the drawings, the insert lower surface 36 can be stepped in a direction from the insert forward surface 28 towards the insert rearward surface 30, as best seen in FIG. 5. In such a configuration, the insert lower surface 36 can include a lower forward surface 40 adjacent the insert forward surface 28, a lower rearward surface 42 adjacent the insert rearward surface 30 and a lower intermediate surface 44 that extends transversely between the lower forward and rearward surfaces 40, 42. It can be seen from the foregoing that cutting insert 24 can be retained in an insert pocket in only one orientation, and so the cutting insert is non-indexable.

Figure 6:
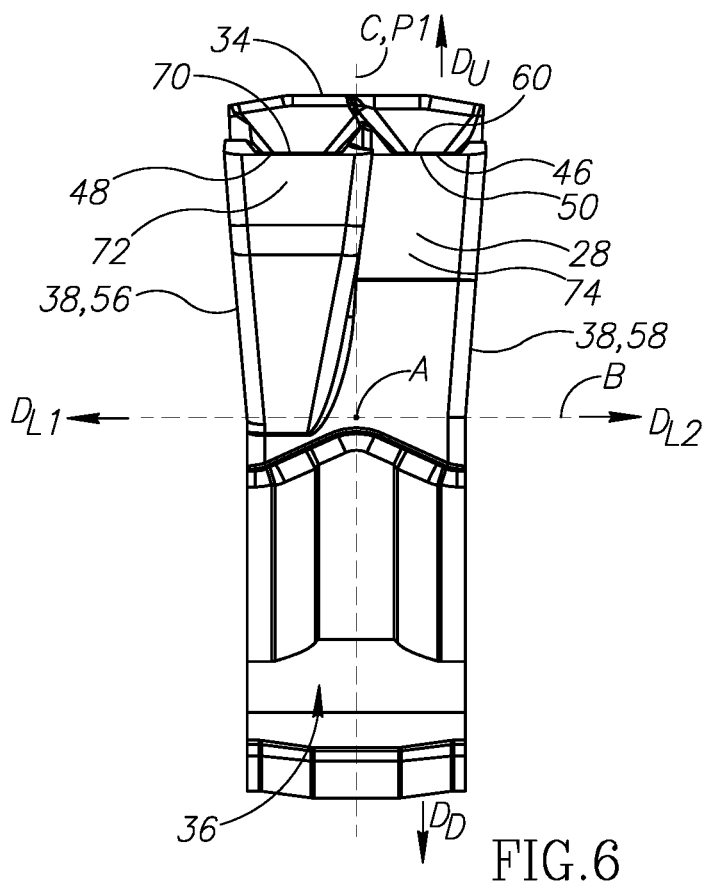
FIG. 6 is a forward view of the cutting insert shown in FIG. 3.

Referring to FIG. 5, the insert upper surface 34 can be parallel to insert axis A. The cutting insert 24 also has an insert lateral axis B that is perpendicular to the insert axis A and intersects the insert side surfaces 38. In particular, the insert side surfaces 38 can be perpendicular to the insert lateral axis B. The insert lateral axis B defines opposite first and second lateral directions $D_{L1}$, $D_{L2}$. The cutting insert 24 also has an insert vertical axis C that is perpendicular to the insert axis A and the insert lateral axis B and intersects the insert upper and lower surfaces 34, 36. The insert axis A, the insert lateral axis B and the insert vertical axis C are all mutually perpendicular to each other. The insert vertical axis C defines opposite upward and downward directions $D_U$, $D_D$. Referring to FIGS. 4 and 6, the insert axis A and insert vertical axis C each extend midway between the insert side surface 38. The insert side surfaces 38 can be parallel to the insert axis A and the insert vertical axis C. The insert axis A and the insert vertical axis C define an imaginary first vertical plane P1 which is perpendicular to lateral axis B. The insert lateral axis B and the insert vertical axis C define a second vertical plane P2 which is perpendicular to the insert axis A.

It should be appreciated that use of the term "lateral" throughout the description and claims refers to a relative position in a direction of the insert lateral axis B towards the left and right, respectively, in FIG. 6. Likewise, use of the terms "upward" and "downward" throughout the description and claims refer to a relative position in a direction of the insert vertical axis C towards the top and bottom, respectively, in FIGS. 5 and 6. Moreover, a forward view of the cutting insert 24 is a view in front of the insert forward surface 28 along the insert axis A. A side view of the cutting insert 24 is a view in front of one of the insert side surfaces 38 along the insert lateral axis B. A top view of the cutting insert 24 is a view in front of the insert upper surface 34 along the insert vertical axis C.

Figure 3:
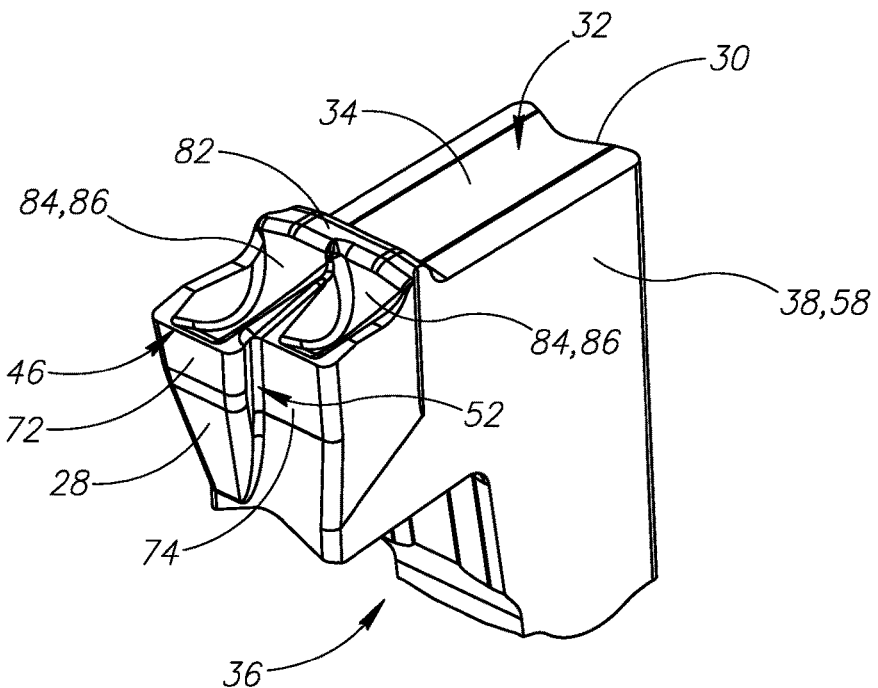
FIG. 3 is a perspective view of a cutting insert in accordance with an embodiment of the present application.

Referring to FIGS. 3 and 4, the cutting insert 24 includes a cutting edge 46 that is formed at an intersection of the insert forward surface 28 and the insert upper surface 34. The cutting edge 46 is split in the widthwise direction of the insert (i.e., along insert lateral axis B) and includes leading and trailing cutting edges 48, 50 that are spaced apart from each other along the insert axis A. The leading cutting edge 48 is axially forward of the trailing cutting edge 50 with respect to the insert axis A and also with respect to the insert lateral axis B. Thus, the leading and trailing cutting edges 48, 50 are axially staggered.

Figure 7:
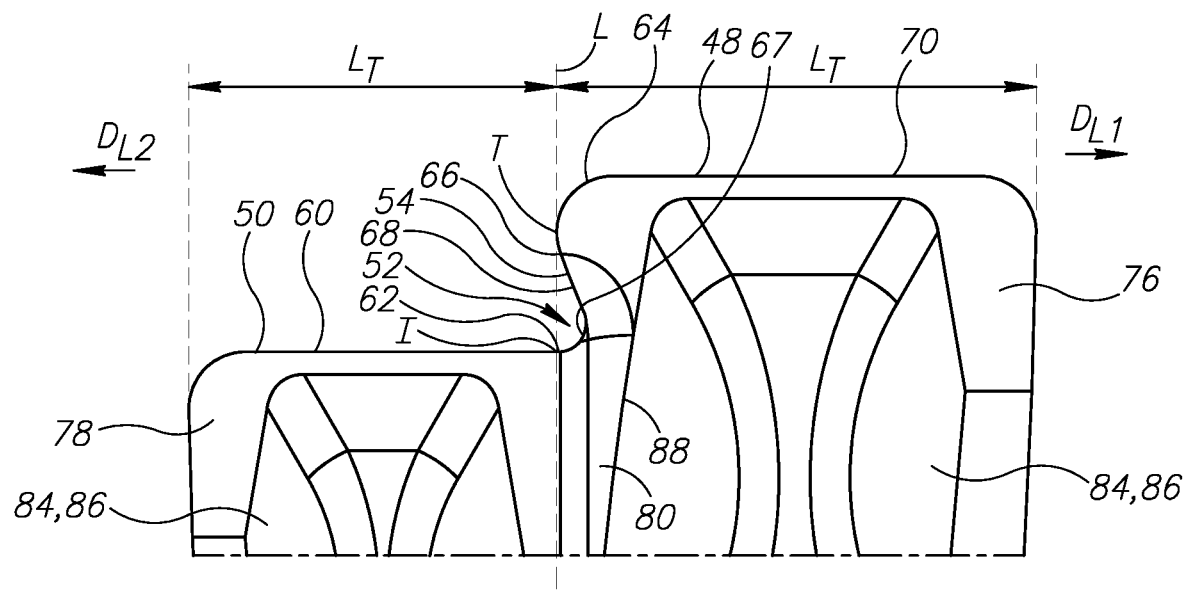
FIG. 7 is a detail of FIG. 4.

The leading and trailing cutting edges 48, 50 do not overlap in the lateral directions $D_{L1}$, $D_{L2}$. However, as seen in the forward view of the cutting insert 24 (FIG. 6), split cutting edge 46 extends the full width between the opposite insert side surfaces 38, due to the configuration of the leading and trailing cutting edges 48, 50. As seen in the figures, the split cutting edge 46 comprises only a single leading cutting edge 48 and a single trailing cutting edge 50 between the opposite side surface 38. As seen in FIG. 7, in accordance with some embodiments of the subject matter of the present application, measured in a direction along the insert lateral axis B, the leading cutting edge 48 has a leading cutting edge length $L_L$ and the trailing cutting edge 50 has a trailing cutting edge length $L_T$. The leading cutting edge length $L_L$ can be in the range 75%≤$L_T$≤125%. Preferably, the trailing cutting edge length $L_T$ can be less than the leading cutting edge length $L_L$.

The cutting insert 24 includes an undercut 52 located in the insert forward surface 28. Advantageously, by virtue of the undercut 52 being located in the insert forward surface 28, as opposed to the insert upper surface 34 for example, the cutting insert 24 can be manufactured without an additional grinding process. The undercut 52 interrupts the split cutting edge 46 at an undercut edge portion 54. Due to the undercut 52, in a forward view of the cutting insert 24 (i.e. FIG. 6), a portion of the insert forward surface 28 is not visible. As seen in FIG. 7, the undercut edge portion 54 extends between the leading and trailing cutting edges 48, 50. It is noted that a portion of the leading cutting edge 48 completely overlaps the undercut edge portion 54 in the lateral direction $D_{L2}$. Thus, the undercut edge portion 54 is a non-cutting edge. That is to say, that the undercut edge portion 54 does not perform any cutting of the work piece but rather serves to provide the cutting insert 24 with a chip-splitting arrangement.

For sake of clarity, the undercut edge portion 54 can be defined with reference to an imaginary line L that is parallel to the insert axis A in a top view of the cutting insert 24 (i.e. FIG. 4). In such a view, the imaginary line L tangentially touches and intersects the split cutting edge 46 at a tangent point T and an intersection point I. The tangent and intersection points T, I delimit an axial extent of the undercut edge portion 54. The undercut edge portion 54 transitions into the leading cutting edge 48 at the tangent point T and transitions into the trailing cutting edge 50 at the intersection point I.

By virtue of the axial staggering of the leading and trailing cutting edges 48, 50 and also because of the undercut 54, in the top view, the cutting insert 24 can lack mirror symmetry about the first vertical plane P1.

Figure 8:
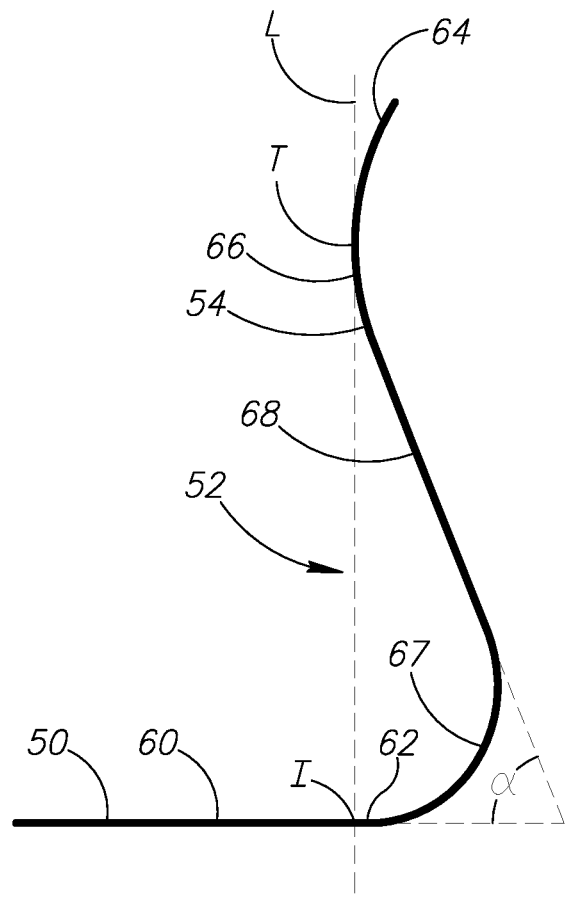
FIG. 8 is a detail of FIG. 7.
Figure 9:
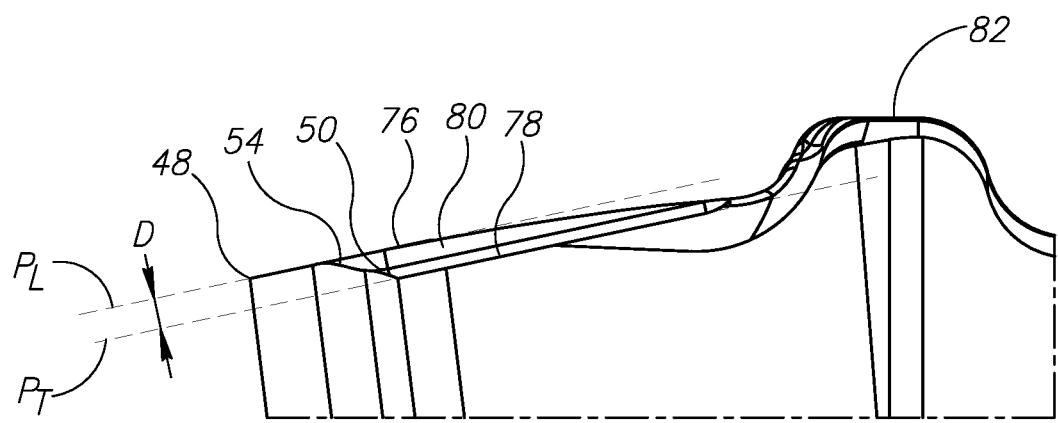
FIG. 9 is a detail of FIG. 5.

Referring now to FIG. 7, the trailing cutting edge 50 includes a straight trailing cutting edge portion 60. Typically, the majority of the trailing cutting edge length $L_T$ can be formed by the straight trailing cutting edge portion 60. The intersection point I is an end-point of the straight trailing cutting edge portion 60. Referring now to FIG. 8, in accordance with some embodiments of the subject matter of the present application, the undercut edge portion 54 can include a straight undercut edge portion 62. The intersection point I can be an end-point of a straight undercut edge portion 62. That is to say, the straight undercut edge portion 62 and the straight trailing cutting edge portion 60 transition into each other at the intersection point I. The straight undercut edge portion 62 can be co-linear with the straight trailing cutting edge portion 60. Thus, the intersection point I can be located at a non-end point of a continuous straight edge, a portion of which serves as a cutting edge to cut the workpiece (i.e. straight trailing cutting edge portion 60) and a separate portion of which does not (i.e. straight undercut edge portion 62). In accordance with some embodiments of the subject matter of the present application, the straight undercut edge portion 62 can transition, at an end opposite the straight trailing cutting edge portion 60, into a concavely curved undercut edge portion 67.

In accordance with some embodiments of the subject matter of the present application, the leading cutting edge 48 can include a convexly curved leading cutting edge portion 64. The undercut edge portion 54 can include a convexly curved undercut edge portion 66. The tangent point T can be an end-point of the convexly curved leading cutting edge portion 64. The tangent point T can be an end-point of a convexly curved undercut edge portion 66. Stated differently, the convexly curved leading cutting edge portion 64 and the convexly curved undercut edge portion 66 can transition into each other at the tangent point T. The tangent point T is the point where the split cutting edge 46 changes lateral directions $D_{L1}$, $D_{L2}$.

The undercut edge portion 54 can include a straight central undercut edge portion 68 extending between the convexly curved undercut edge portion 66 and the concavely curved undercut edge portion 67. As seen in FIG. 8, the straight central undercut edge portion 68 and the straight trailing cutting edge portion 60 form an external angle α. The external angle can be in the range 60°≤α≤70°.

In accordance with some embodiments of the subject matter of the present application, the leading cutting edge 48 can include a straight leading cutting edge portion 70. Typically, the majority of the leading cutting edge length $L_L$ can be formed by the straight leading cutting edge portion 70. In a top view of the cutting insert 24 (i.e. FIG. 4), the straight leading and trailing cutting edge portions 70, 60 can be parallel with each other. Moreover, the straight leading cutting edge portion 70 can be perpendicular to the insert axis A. Likewise, the straight trailing cutting edge portion 60 can be perpendicular to the insert axis A. In a forward view of the cutting insert 24 (i.e. FIG. 6), the straight leading and trailing cutting edge portions 70, 60 can be parallel with each other. Moreover, the straight leading cutting edge portion 70 can be parallel to the insert lateral axis B. Likewise, the straight trailing cutting edge portion 60 can be parallel to the insert lateral axis B. The straight leading and trailing cutting edge portions 70, 60 can be aligned with each other.

The insert side surfaces 38 include a leading side surface 56 which is closer to the leading cutting edge 48 than to the trailing cutting edge 50, and a trailing side surface 58 which is closer to the trailing cutting edge 50 than to the leading cutting edge 48. In accordance with some embodiments of the subject matter of the present application, the cutting insert 24 includes exactly one undercut 52 located in the insert forward surface 28 and interrupting the split cutting edge 46. Thus, the split cutting edge 46 can include exactly one undercut edge portion 54. In such a configuration, the leading cutting edge 48 extends to the leading side surface 56 and the trailing cutting edge 50 extends to the trailing side surface 58.

The insert forward surface 28 includes leading and trailing relief surfaces 72, 74 that extend from the leading and trailing cutting edges 48, 50, respectively. In accordance with some embodiments of the subject matter of the present application, the undercut 52 can be located between the leading and trailing relief surfaces 72, 74. In this non-limiting example shown in the drawings, in a forward view of the cutting insert 24 (i.e. FIG. 6), the leading relief surface 72 can have a trapezoidal basic shape, with a varying width that decreases in a direction towards the insert lower surface 36.

The insert upper surface 34 includes leading and trailing rake surfaces 76, 78 that extend in the rearward direction $D_R$ from the leading and trailing cutting edges 48, 50, respectively. The leading and trailing cutting edges 48, 50 are formed at the intersection of the leading and trailing relief surfaces 72, 74 and the leading and trailing rake surfaces 76, 78, respectively. In accordance with some embodiments of the subject matter of the present application, the leading rake surface 76 can be defined by a leading rake plane $P_L$ and the trailing rake surface 78 can be defined by a trailing rake plane $P_T$. As seen in the FIG. 5 side view of the cutting insert 24 (or a detail thereof, e.g. FIG. 8), the leading and trailing rake planes $P_L$, $P_T$ can be parallel to each other and spaced apart from each other by a rake plane distance D. The rake plane distance D can be in the range $0.2 \text{ mm} \leq D \leq 0.3 \text{ mm}$. The leading and trailing rake planes $P_L$, $P_T$ can be sloped upwardly in the rearward direction $D_R$. Stated differently, the leading and trailing rake planes $P_L$, $P_T$ can increase in distance from the insert axis A as they extend from the respective cutting edge 48, 50 in the rearward direction $D_R$. The leading rake surface 76 can include a laterally inclined surface 80 that extends upwardly from the trailing rake surface 78 in a direction towards the leading side surface 56. The laterally inclined surface 80 can extend to the undercut edge portion 54 in the forward direction $D_F$. The leading and trailing rake surfaces 76, 78 can extend in the rearward direction $D_R$ to a chip deflection projection 82 oriented transversely to the insert axis A.

Figure 10:
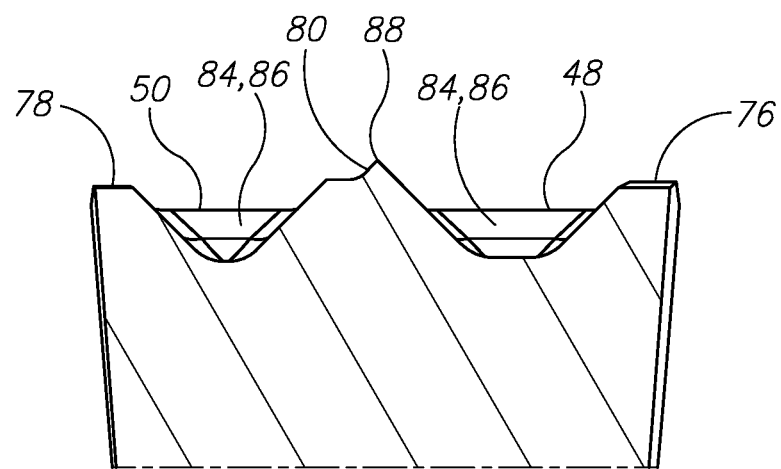
FIG. 10 is a fragmentary cross sectional view taken along line X-X shown in FIG. 4.

In accordance with some embodiments of the subject matter of the present application, the leading and trailing rake surfaces 76, 78 can each include a chip-control arrangement 84 that is spaced apart from the split cutting edge 46. Each chip-control arrangement 84 can include a chip-control depression 86 recessed in the respective rake surface 76, 78. The chip-control arrangements 84 associated with the leading and trialing rake surfaces 76, 78 may not be identical. Each chip-control arrangement 84 can extend longitudinally in a rearward direction $D_R$. As seen in a cross-sectional view taken in a plane perpendicular to the insert axis A and looking in the forward direction $D_F$ (e.g. FIG. 10), the laterally inclined surface 80 can extend to the chip-control arrangement 84 located on the leading rake surface 76, thus forming a ridge edge 88 at the chip-control arrangement 84.

It should be noted that, as shown in the prior art, trailing cutting edges can have an axially leading portion that is concavely curved (even if the curvature is relatively small). This concavely curved portion is the first portion of the trailing cutting edge to encounter the workpiece during cutting operations and is prone to wear. Wear of the trailing cutting edge 50 is detrimental to its chip forming capabilities and also reduces tool life. Thus, by virtue of the intersection point I being an end-point of the straight trailing cutting edge portion 60, the split cutting edge 46, or more specifically, the trailing cutting edge 50, experiences less wear.

Although the subject matter of the present application has been described to a certain degree of particularity, it should be understood that various alterations and modifications could be made without departing from the spirit or scope of the invention as hereinafter claimed.

What is claimed is:

1. A cutting insert (24), having an insert axis (A) defining opposite forward and rearward directions (DF, DR), the cutting insert (24) comprising:
   axially opposite insert forward and rearward surfaces (28, 30) and an insert peripheral surface (32) extending therebetween, the insert peripheral surface (32) including opposite insert upper and lower surfaces (34, 36) and opposite insert side surfaces (38) that connect the insert upper and lower surfaces (34, 36);
   an insert lateral axis (B) that is perpendicular to the insert axis (A), an insert vertical axis (C) that is perpendicular to the insert axis (A) and the insert lateral axis (B) and intersects the insert upper and lower surfaces (34, 36), a first vertical plane (P1) defined by insert axis (A) and the insert vertical axis (C) and a second vertical plane (P2) defined by the insert lateral axis (B) and the insert vertical axis (C);
   a split cutting edge (46), formed at an intersection of the insert forward surface (28) and the insert upper surface (34), and comprising leading and trailing cutting edges (48, 50), the leading cutting edge (48) being axially forward of the trailing cutting edge (50); and
   an undercut (52) located in the insert forward surface (28) and interrupting the split cutting edge (46) at an undercut edge portion (54) that extends between the leading and trailing cutting edges (48, 50); wherein:
   the trailing cutting edge (50) comprises a straight trailing cutting edge portion (60);
   the undercut edge portion (54) comprises a straight undercut edge portion (62) which is co-linear with the straight trailing cutting edge portion (60);
   in a top view of the cutting insert (24), an imaginary line (L) that is parallel to the insert axis (A) tangentially touches and intersects the split cutting edge (46) at a tangent point (T) and an intersection point (I), the tangent and intersection points (T, I) delimiting an axial extent of the undercut edge portion (54);
   the straight undercut edge portion (62) transitions, at an end opposite the straight trailing cutting edge portion (60), into a concavely curved undercut edge portion (67); and
   the intersection point (I) is an end-point of both the straight trailing cutting edge portion (60) and the straight undercut edge portion (62).

2. The cutting insert (24), according to claim 1, wherein the tangent point (T) is an end-point of a convexly curved leading cutting edge portion (64) of the leading cutting edge (48).

3. The cutting insert (24), according to claim 1, wherein the tangent point (T) is an end-point of a convexly curved undercut edge portion (66) of the undercut edge portion (54).

4. The cutting insert (24), according to claim 1, wherein:
the insert forward surface (28) comprises leading and trailing relief surfaces (72, 74);
the insert upper surface (34) comprises leading and trailing rake surfaces (76, 78); and
the leading and trailing cutting edges (48, 50) are formed at the intersection of the leading and trailing relief surfaces (72, 74) and the leading and trailing rake surfaces (76, 78), respectively.

5. The cutting insert (24), according to claim 4, wherein:
the leading rake surface (76) is defined by a leading rake plane (PL) and the trailing rake surface (78) is defined by a trailing rake plane (PT); and
the leading and trailing rake planes (PL, PT) are parallel to each other and spaced apart from each other by a rake plane distance (D).

6. The cutting insert (24), according to claim 5, wherein the rake plane distance (D) is in the range 0.2 mm≤D≤0.3 mm.

7. The cutting insert (24), according to claim 4, wherein the leading and trailing rake planes (PL, PT) are sloped upwardly in the rearward direction (DR).

8. The cutting insert (24), according to claim 4, wherein:
the opposite insert side surfaces (38) include a leading side surface (56), which is closer to the leading cutting edge (48) than to the trailing cutting edge (50), and a trailing side surface (58) which is closer to the trailing cutting edge (50) than to the leading cutting edge (48); and
the leading rake surface (76) comprises a laterally inclined surface (80) extending upwardly from the trailing rake surface (78) in a direction towards the leading side surface (56).

9. The cutting insert (24), according to claim 8, wherein the laterally inclined surface (80) extends to the undercut edge portion (54) in the forward direction (DF).

10. The cutting insert (24), according to claim 8, wherein the laterally inclined surface (80) extends to a chip-control arrangement (84) located on the leading rake surface (76) and forms a ridge edge (88) at the chip-control arrangement (84).

11. The cutting insert (24), according to claim 4, wherein the leading and trailing rake surfaces (76, 78) each comprise a chip-control arrangement (84) that is spaced apart from the split cutting edge (46).

12. The cutting insert (24), according to claim 11, wherein each chip-control arrangement (84) is a chip-control depression recessed in the respective rake surface (76, 78).

13. The cutting insert (24), according to claim 1, wherein the cutting insert (24) comprises exactly one undercut (52) located in the insert forward surface (28) and interrupting the split cutting edge (46).

14. The cutting insert (24), according to claim 1, wherein in a top view of the cutting insert (24), the straight trailing cutting edge portion (60) is perpendicular to the insert axis (A).

15. The cutting insert (24), according to claim 1, wherein in a forward view of the cutting insert (24), the straight trailing cutting edge portion (60) is parallel to the insert lateral axis (B).

16. The cutting insert (24), according to claim 1, wherein the leading cutting edge (48) comprises a straight leading cutting edge portion (70).

17. The cutting insert (24), according to claim 16, wherein in a top view of the cutting insert (24), the straight leading and trailing cutting edge portions (70, 60) are parallel with each other.

18. The cutting insert (24), according to claim 17, wherein in a top view of the cutting insert (24), the straight leading and trailing cutting edge portions (70, 60) are perpendicular to the insert axis (A).

19. The cutting insert (24), according to claim 16, wherein in a forward view of the cutting insert (24), the straight leading and trailing cutting edge portions (70, 60) are parallel with each other.

20. The cutting insert (24), according to claim 19, wherein in a forward view of the cutting insert (24), the straight leading and trailing cutting edge portions (70, 60) are parallel to the insert lateral axis (B).

21. The cutting insert (24), according to claim 20, wherein in a forward view of the cutting insert (24), the straight leading and trailing cutting edge portions (70, 60) are aligned with each other.

22. The cutting insert (24), according to claim 1, wherein, measured in a direction along the insert lateral axis (B):
the leading cutting edge (48) has a leading cutting edge length (LL);
the trailing cutting edge (50) has a trailing cutting edge length (LT); and
the leading cutting edge length (LL) is in the range 75%≤LT≤125%.

23. The cutting insert (24), according to claim 1, wherein the split cutting edge (46) comprises only a single leading cutting edge (48) and a single trailing cutting edge (50), between the opposite side surfaces (38).

24. The cutting insert (24), according to claim 1, wherein in a top view of the cutting insert (24), the cutting insert (24) lacks mirror symmetry about the first vertical plane (P1).

25. The cutting insert (24), according to claim 23, wherein in a top view of the cutting insert, the single leading cutting edge (48) and the single trailing cutting edge (50) are parallel to one another.

26. The cutting insert (24), according to claim 1, wherein:
the undercut edge portion (54) further comprises a straight central undercut portion (68) between the tangent point (T) and the concavely curved undercut edge portion (67); and
the straight central undercut edge portion (68) and the straight trailing cutting edge portion (60) form an acute external angle (α).

27. The cutting insert (24), according to claim 26, wherein:
the acute external angle (α) is in the range of 60°≤α≤70°.

28. The cutting insert (24), according to claim 26, wherein:
the split cutting edge (46) comprises only a single leading cutting edge (48) and a single trailing cutting edge (50), between the opposite side surfaces (38); and
in a top view of the cutting insert, the single leading cutting edge (48) and the single trailing cutting edge (50) are parallel to one another.

* * * * *